Nov. 10, 1959 B. WALKER 2,912,235
AUTOMATIC AUXILIARY SUPPORT FOR A VEHICLE
Filed Sept. 30, 1954 3 Sheets-Sheet 3

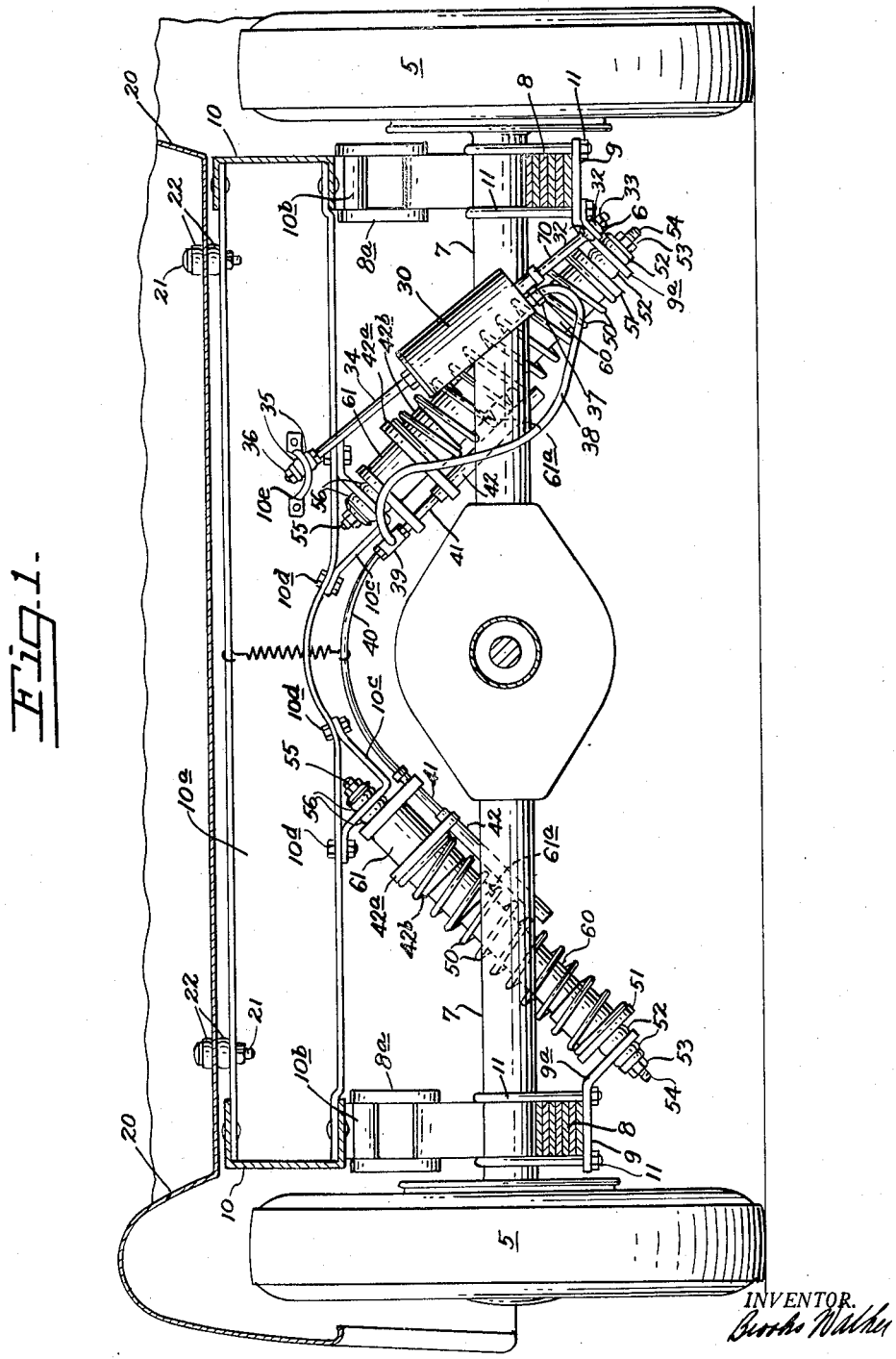

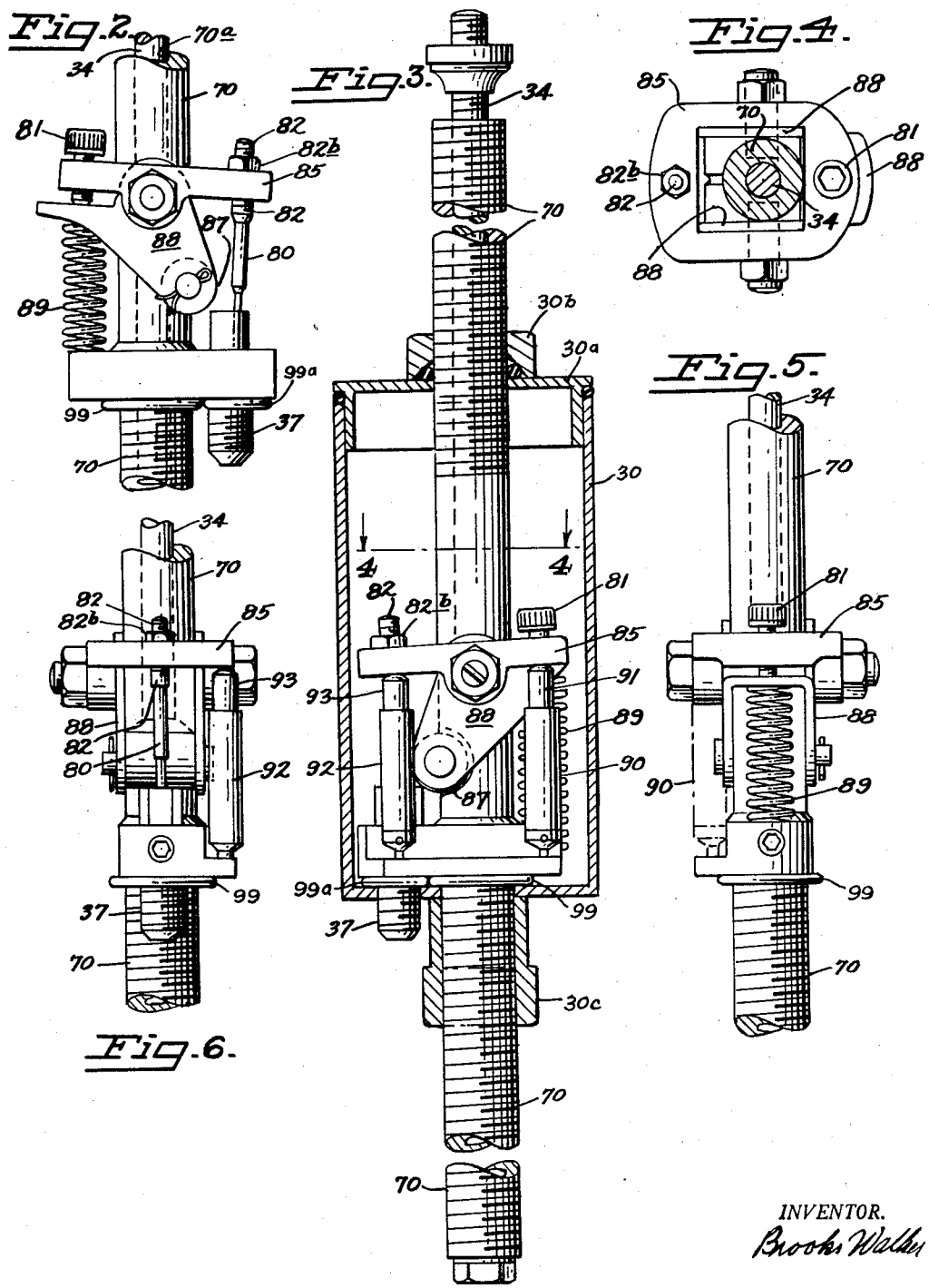

INVENTOR.
Brooks Walker

# United States Patent Office 2,912,235
Patented Nov. 10, 1959

2,912,235

AUTOMATIC AUXILIARY SUPPORT FOR A VEHICLE

Brooks Walker, Piedmont, Calif., assignor to Monroe Auto Equipment Company, Monroe, Mich., a corporation of Michigan Application September 30, 1954, Serial No. 459,441

14 Claims. (Cl. 267—8)

This invention pertains to improvements in variable rate suspension systems and the mechanism for controlling them.

Variable rate suspension systems have been used before this invention; however, the method and design shown in this invention are believed to be simple, involve minimum plumbing, minimum installation, and to be fully automatic without exterior power.

A further object of this invention is to provide auxiliary springs of variable degrees of support for a portion of a vehicle that are adapted to be mounted on regular type telescoping shock absorbers and utilize the shock absorber mountings to carry the auxiliary spring support from the axle to the chassis.

Another object of the invention is to provide an integral pump reservoir and control valve operated from the motion of the vehicle wheel structure relative to the chassis and to use the fluid from said fluid pump and valves to tend to maintain the same axle to frame clearance over a variable vehicle load so that a higher rate spring combination is provided for heavier loads than for light loads.

Another object of the invention is to provide lower rate suspension for light loads than is customary in present vehicle construction and at the same time automatically provide a higher rate spring combination for supporting heavier loads in the vehicles after the vehicle has traveled a short distance with such heavier loads.

The power for changing the rate of said springs at the same axle to frame clearance is taken from the normal axle to frame motion while traveling down the highway.

A further object of the invention is to utilize the axle to frame clearance to control the flow of fluid from the axle driven pump to either load the auxiliary springs, unload them, or hold a given loading depending on whether the axle to frame clearance is more or less than a predetermined amount.

A further object of this invention is to provide a piston driven by the axle to frame motion in combination with control valves for said piston driven by said piston and time delay controls for said valves to prevent this operation except under sustained changes in position of said piston due to changes in loading of said vehicle.

Other objects of this invention will be more apparent from the teachings of the accompanying specification and claims.

I have illustrated my invention by way of example in the accompanying drawings, in which:

Fig. 1 is an elevation view, partly in section, of a portion of a vehicle illustrating one form of the invention.

Fig. 2 is a side elevation of a portion of the pump and valve control mechanism from Fig. 1.

Fig. 3 is a side elevation from the other side of the structure shown in Fig. 2, but showing more of its supporting structure.

Fig. 4 is a top plan view of the structure shown in Fig. 3, taken at sec. 4—4.

Fig. 5 is a side elevation view of the structure shown in Fig. 2, as viewed from the left of Fig. 2.

Fig. 6 is a side elevation view of the structure shown in Fig. 2, as viewed from the right of Fig. 2.

On all figures like numerals of reference refer to corresponding parts in the various figures.

Figure 7:
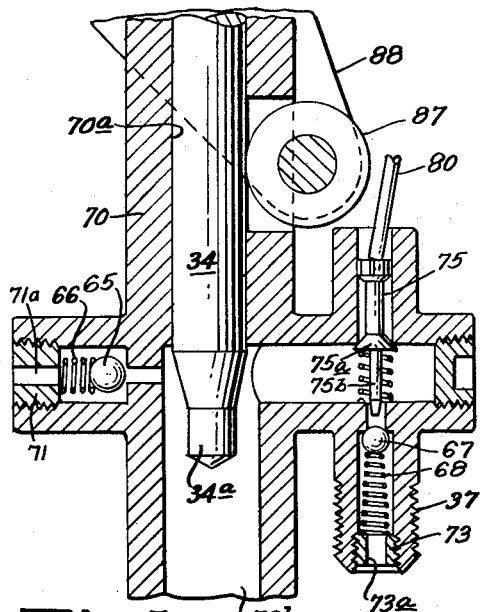
Fig. 7 is an enlarged view partly in section of the center portion of the structure shown in Fig. 2 with the part shown in the pump position.

Reference character 20 illustrates a vehicle body secured to frame cross member 10a by bolt 21 and flexible element 22. Cross member 10a is secured to frame 10. Frame 10 carries shackle supports 10b, shackles 8a, and leaf springs 8 at each side of said frame 10. Rear axle 7 supports springs 8 by U-bolt and nut 11 and spring plates 9. Wheels 5 support axle 7. Shock absorbers 60 are mounted on spring plate extension 9a at their bottoms by flexible rubber-like washers 52 and nuts 53 on shock bolt ends 54. Coil spring retainer 51 is secured to the base of the shock absorber in a manner described in my co-pending U.S. application, Ser. No. 427,927, entitled "Spring Adapters for Shock Absorbers," now U.S. Patent No. 2,889,144, issued June 2, 1959, and carries the lower end of coil spring 50 when said spring is supporting said frame in addition to the support of said leaf springs 8. The top of said shock absorbers 60 has a rock guard 61 and pin end 55 which is secured to adapter 10c. Adapter 10c is secured to cross member 10a by bolts 10d. Flexible washers or bushings 56 allow flexibility to the mounting of the top of the shock absorbers. Piston 41 fits into cylinder 42 located at one side of spring 50. Spring adapter 42a is rigidly secured to cylinder 42. Sleeve 42b is attached to adapter 42a and slides over stone guard 61. Spring 50 is preferably secured to adapter 42a and sleeve 42b to keep the two together at all times. Spring adapter 42a is a free sliding fit over rock guard 61 and can slide down to, but not past, the flange 61a at the lower edge of rock guard 61. This flange 61a forms the lower stop for cylinder 42 and spring adapted 42a and sleeve 42b. A hydraulic hose 40 connects pistons 41 so that fluid from hose 40 can pass through hollow piston 41 into cylinder 42 to cause cylinder 42 to be lowered, to load spring 50 under control of fluid pressure flowing through hose 40. Reservoir, pump, and valve unit 30 is secured at one end through body extension 70 to adapter 6 which is fastened to spring U-bolt and nut 11. At the other end of pump unit 30, piston 34 is secured to bracket 10e by rubber-like washers 35 and nut 36 in a manner similar to the shock absorber end mountings. Extension 70 is likewise secured to adapter 9 by flexible washers 32 and nut 33. Hose 40 is secured to the right hand piston 41 by a T coupling 39 that connects hose 38 to both cylinders 42 through their respective hollow pistons 41. The pump reservoir, valve unit 30, operates as follows: referring to Figs. 2 through 10 numeral 34 designates the piston at the upper end of unit 30. Piston 34 operates in cylinder 70a which is a close running fit on piston 34. Below cylinder 70a is a larger diameter cylinder 70b into which piston 34 extends when the axle 7 approaches frame 10. When a heavy load has been added to the vehicle, such as extra passengers or material, piston 34 is forced down so its end rides past roller 87 to force roller 87 to the position shown in Fig. 10. When roller 87 is in this position, as shown in Fig. 10, it forces roller support 88 to rotate counter-clockwise against spring 89. Rocker arm 85 has an adjustment screw 81 which rides on roller support 88. At the other end of rocker 85 is mounted an adjustment rod 82 and lock nut 82b. Push rod 80 rides on rod 82 at its top and on valve 75 at its lower end. Push rod 80 has ball-type ends and rod 82 and valve 75 have sockets to receive said ball-type ends. Two dash pots of the telescoping types with internal expansion springs have cylinders 90 and 92 in which are mounted pistons 91 and 93 respectively. These dash pots resist rapid motion of rocker arm 85 which might be caused by rapid motion of roller support 88 when the end of piston rod 34 moves past roller 87 as a result of traveling over a rough road. However, when a heavy load is added piston 34 will be moved below roller 87 and held there in an oscillating condition while driving. This oscillation of piston 34 below roller 87 causes a pumping action; with fluid flow from the reservoir through intake valve 75 (since the valve and its adjacent port are below the level of the fluid in the reservoir) and out past outlet check valve 67 past spring 68 through orifice 73a in spring retainer 73 and into fitting 37, hose 38, T 39, to cylinder 42 at the right of Fig. 1 and through hose 40 to cylinder 42 at the left of Fig. 1.

Figure 9:
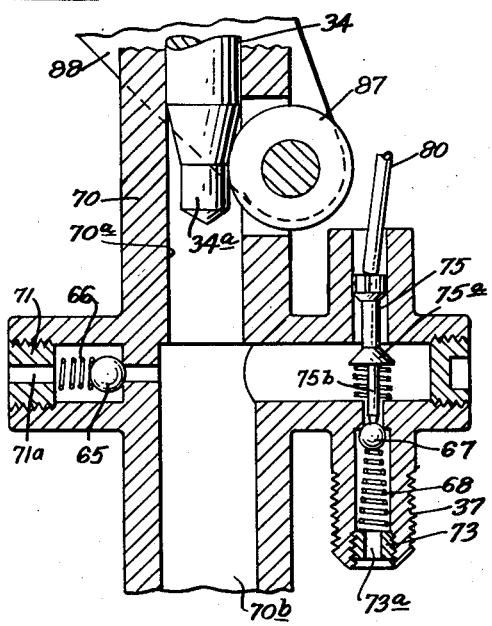
Fig. 9 is similar to Fig. 7 with the part shown in the pressure holding position and free flow, no resistance to pump action.
Figure 10:
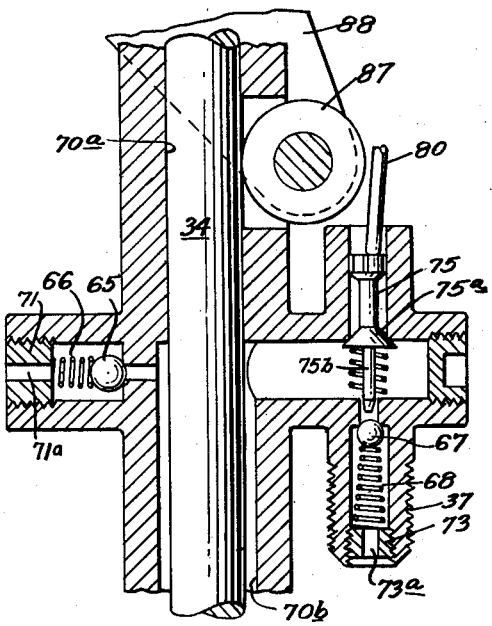
Fig. 10 is similar to Fig. 7 with the pump plunger in a much lower position than in Fig. 7 and the valves still in the position to pump and hold.

After oscillations due to road travel have pumped sufficient fluid from reservoir 30 to cylinders 42 to cause enough load to be taken by supplemental springs 50, piston 34 will be withdrawn to a position as shown in Fig. 9, in which roller 87 rides on small end 34a of piston 34. In this position roller 87 and rocker arm 85 are held in such a position that push rod 80 holds valve 75 in the position shown in Fig. 9. In this position outlet check valve 67 holds the fluid in cylinders 42, hoses 40 and 38, etc. to hold the position of spring adapters 42a in a load carrying position. The piston will continue to oscillate but valve 75a will be open so the liquid from reservoir 30 will flow back and forth past valve 75a for free, no-pump flow. In this position as roller 87 passes over the full diameter of piston 34 during short intervals of the oscillating cycle, dash pots 90 and 92 will prevent the following of rocker arm 85 so the valve 75 will remain in the hold, no-pump position shown in Fig. 9. If the load is increased the piston rod will assume a position somewhat like that shown in Fig. 7, when the valve will be in the position shown in Fig. 7, after an appropriate time delay of, say, ten to thirty seconds, which is controlled by the dash pots 92 and 90. In this position pumping will take place to carry more load on springs 50 until piston rod 34 is again in the hold position of desirable axle to frame clearance shown in Fig. 9. The internal spring in dash pot 92 is stronger than the spring in dash pot 90 to cause rocker arm 85 to follow (after a suitable delay) the motion of roller support 88.

Figure 8:
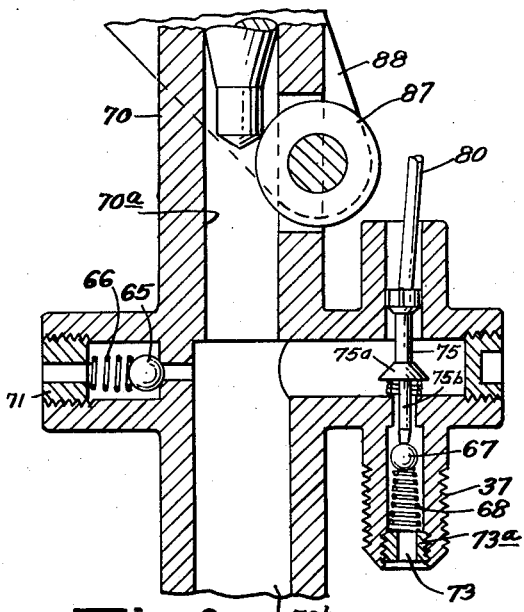
Fig. 8 is similar to Fig. 7 with the part shown in the no pump, dump position.

When the load is removed from the vehicle, the plunger 34 moves up past roller 87 to the position shown in Fig. 8. In this position, after a suitable delay to differentiate from a single bump, valve 75 will be forced down to the dump position shown in Fig. 8 where valve 75a is off its seat and stem 75b forces check valve 67 off its seat to provide free flow or dump action from cylinders 42, through hollow pistons 41, hoses 40 and 38, past open check valve 67 and open valve 75a, the fluted upper end of valve 75, to the reservoir inside the case 30.

Plug 71 retains spring 66 to hold valve 65 tightly on its seat to form a relief valve to limit the maximum pressure obtainable by this pump in case an excessive load is carried that cannot be leveled by this leveling mechanism. Port 71a communicates to the reservoir formed inside case 30 through port 71a in plug 71. The reservoir can be filled by removing the cover 30a at the top, by first loosening nut 30b. The housing 30 is held in place by lower nut 30c forcing the base of the housing against O-type rings or gaskets 99 and 99a. This construction is such that the dash pots 90 and 92, the pump and valves are all self-bleeding, as outlets near the top of each release any trapped air, etc.

From the foregoing it may be seen that I have provided a self-contained automatic vehicle leveling device operated by waste energy from axle to frame motion, and one where one pump and valve assembly operates one or more devices to add yieldable load carrying support to the vehicle over the minimum yieldable support that such vehicle might have had before this automatic auxiliary spring support was added.

The mechanism is simple, easy to install, like shock absorbers or on shock absorbers, offers a minimum of unsprung weight, is self-bleeding, and requires no controls by the operator while still being fully automatic to vary the yieldable support as needed.

Another advantage is to allow a lower original silhouette of the vehicle as auxiliary support is provided when load is added. Thus, less axle to frame clearance is needed when the vehicle is empty or lightly loaded.

Another advantage is the maintenance of substantially light load ground clearance when carrying a heavy load.

A further and very important advantage is the light weight and low cost of this invention when applied to a new vehicle and the ease with which it can be applied to a vehicle already in use, with minimum changes and low installation costs.

Applicant does not wish to limit this invention in any way to the details or mode of operation set forth in this specification and drawings, for it will be obvious that wide departure may be made in the way of details without departing from the spirit and scope of this invention which is set forth in the following claims.

I claim as my invention:

1. A vehicle having a body, wheels for said body, supporting structures for said body on which said wheels rotate, resilient means for supporting said body on said structures, auxiliary resilient means, means for mounting said auxiliary resilient means for actuation between a non-supporting status and a supporting status between said body and at least one of said structures to assist said first resilient means associated therewith to support said body, automatic means for effecting said actuation of said auxiliary resilient means into and out of supporting status, said automatic means being controlled by the clearance between said supporting structure and said body, said means for mounting said auxiliary resilient means including a shock absorber, one end of said shock absorber mounted to move with said body and the other with a part of said supporting structure on which said wheels rotate, said auxiliary means mounted on and carried by said shock absorber, said shock absorber being of the telescoping type and having a stone guard moving with the upper end of said shock absorber, said auxiliary suspension means being guided in its actuation into and out of supporting status by said stone guard, said auxiliary means including a cylinder and associated piston, the major portion of said cylinder and piston being located between the ends of said auxiliary resilient means and supported at one end of said shock absorber, said cylinder and piston adapted to move one end of said auxiliary resilient means relative to said end of said shock absorber on which said cylinder and piston are mounted.

2. A vehicle having a body, wheels for said body, supporting structures for said body on which said wheels rotate, resilient means for supporting said body on said structures, auxiliary resilient means, means for mounting said auxiliary resilient means for actuation between a non-supporting status and a supporting status between said body and at least one of said structures to assist said first resilient means associated therewith to support said body, automatic means for effecting said actuation of said auxiliary resilient means into and out of supporting status, said automatic means being controlled by the clearance between said supporting structure and said body, said means for mounting said auxiliary resilient means including a shock absorber, one end of said shock absorber mounted to move with said body and the other with a part of said supporting structure on which said wheels rotate, said auxiliary means mounted on and carried by said shock absorber, said shock absorber being of the telescoping type and having a stone guard moving with the upper end of said shock absorber, said auxiliary suspension means being guided in its actuation into and out of supporting status by said stone guard, said stone guard forming the lower limit of motion of the device which increases the loading of said auxiliary resilient means, said auxiliary means including a cylinder and associated piston, the major portion of said cylinder and piston being located between the ends of said auxiliary resilient means and supported at one end of said shock absorber, said cylinder and piston adapted to move one end of said auxiliary resilient means relative to said end of said shock absorber on which said cylinder and piston are mounted.

3. A vehicle having a body, wheels for said body, supporting structures for said body on which said wheels rotate, resilient means for supporting said body on said structures, auxiliary resilient means, means for mounting said auxiliary resilient means for actuation between a non-supporting status and a supporting status between said body and at least one of said structures to assist said first resilient means associated therewith to support said body, automatic means for effecting said actuation of said auxiliary resilient means into and out of supporting status, said automatic means being controlled by the clearance between said supporting structure and said body, said means for mounting said auxiliary resilient means including a shock absorber, one end of said shock absorber mounted to move with said body and the other with a part of said supporting structure on which said wheels rotate, said auxiliary means mounted on and carried by said shock absorber, auxiliary means connected between said body and a portion of said supporting structure on which said wheels rotate, said auxiliary device containing a pump driven by the relative motion of the ends of said auxiliary device, control valves for the fluid pumped by said pump, said valves controlled by the sustained changed distances between the ends of said auxiliary device but not operated by sudden single changes in said distances, said device also including a fluid reservoir and a fluid connection to the mechanism that changes the actuation of a major part of said auxiliary suspension device from its inactive to its active status, said pump including a piston, said valves rendering said pump ineffective during a predetermined range of operation of said piston.

4. A vehicle having a body, wheels for said body, supporting structure on which said wheels rotate, resilient means for mounting said body on said structure, means for varying the degree of support provided said body by said resilient means, automatic means for varying the degree of said support, said automatic means being controlled by the clearance between said body and said supporting structure, said automatic means including a fluid pump and control valves associated with said pump, the movement of said supporting structure relative to said body operating said pump, said control valves controlling the fluid from said pump to said means for varying said degree of support, said valves controlled by the sustained changed distances between the ends of said auxiliary device but not operated by sudden single changes in said distances, said device also including a fluid reservoir and a fluid connection to the mechanism that changes the position of a major part of said auxiliary suspension device from its inactive to its active position, a hydraulic cylinder, said control valves directing said flow from said pump to said hydraulic cylinder or from said cylinder or to render said pump non-operative as a pump, the operation of said valves being controlled by the relative position of said wheel supporting structure relative to said body, a time delay mechanism in the operating control for said valves so that sudden movements of said wheel supporting structure relative to said body will not change said control valves but some sustained changes in the position of said wheel supporting structure relative to said body will cause changes in fluid flow through said valve, said pump having a piston, said piston moving in said cylinder as a direct function of the relative vertical clearance between said body and supporting structure, the continuous motion of said piston relative to said cylinder in three average positions of operation within said cylinder controlling said valves to render said pump: first, effective as a pump; second, ineffective as a pump; or third, return previously pumped liquid to said reservoir to reduce said resilient support.

5. A vehicle having a body, wheels for said body, supporting structure on which said wheels rotate, resilient means for mounting said body on said structure, spring means for varying the degree of support provided said body by said resilient means, and a fluid pump having a fluid discharge that actuates said spring means, a reservoir, said pump including a piston, a cylinder, valves for controlling the intake and outlet of said pump, said valves being controlled by mechanical means effected by the average vertical distance between the said body and said supporting structure to create three stages of pump action even when said piston is moving continuously, as when traversing rough terrain with three different loads, but in three average positions in said cylinder: to control said pump to three different types of operation; first, for normal pumping discharge of fluid; second, to render said pump ineffective while holding fluid previously pumped; three, to discharge liquid previously pumped back to said reservoir, the actuation of said pump being controlled by the clearance between said body and said supporting structure, control valves associated with said pump, the movement of said supporting structure relative to said body operating said pump and said control valves so as to hold said clearance at a substantially constant average level, said control valves having means to provide a time-delay action, so as to operate on sustained changes in average clearance between said body and said supporting structure but not on sudden instantaneous changes.

6. A vehicle having supporting wheels, a body, resilient means for supporting said body on said wheels, a structure on which said wheels rotate, a shock absorber mounted between said body and said wheels, a coil spring mounted around the outside of said shock absorber and substantially the full length of said shock absorber between the mountings for said shock absorber and a liquid pump operated by the motion of said structure relative to said body when said vehicle is moving over a roadway, said liquid pump being operatively connected to one end of said coil spring through a hydraulically controlled mechanism mounted on said shock absorber to vary its position so as to bring it into and out of a load-carrying status and to vary the degree of its load-carrying status according to the load supported by said body, said mechanism having a substantial portion mounted outside said coil spring and below the top of said coil spring.

7. A vehicle having a body, wheels for said body, supporting structure on which said wheels rotate, resilient means for mounting said body on said structure, an auxiliary unit connected between said body and said resilient means, said auxiliary means including a fluid reservoir, a pump, a time-delay body height control valve, said resilient means providing variable support which differs for different loads, said auxiliary device providing the control for said variations in said resilient means, said control being by fluid means actuated by said pump and controlled by said time-delay body height control valve, said pump being actuated by changes in the distance between said body and said supporting structure, said auxiliary unit unit being supported at one end by a flexible connection to said body and at the other end to said supporting structure, said resilient means including two yieldable supports, one at each side of the center line of the vehicle, both of said supports being controlled by said single auxiliary unit, fluid connections between said single auxiliary unit and said two resilient means.

8. A vehicle having a body, wheels for said body, supporting structure on which said wheels rotate, resilient means for mounting said body on said structure, an auxiliary unit connected between said body and said resilient means, said auxiliary means including a fluid reservoir, a pump, a time-delay body height control valve, said resilient means providing variable support which differs for different loads, said auxiliary device providing the control for said variations in said resilient means, said control being by fluid means actuated by said pump and controlled by said time-delay body height control valve, said pump being actuated by changes in the distance between said body and said supporting structure, said reservoir and time-delay body height control valve being mounted on and moving with said supporting structure, said resilient means including two coil springs, one near each rear wheel, said single auxiliary unit effecting the action of each said coil spring in supporting said body to effect a greater support when heavily loaded at a given average body to supporting structure clearance than when lightly loaded with the same average body to supporting structure clearance.

9. A vehicle having a sprung portion and an unsprung portion, a fluid pump, said pump including a piston, a cylinder, said piston and cylinder connected between said sprung and unsprung portion so that motion between said sprung and unsprung portion creates relative motion between said piston and said cylinder, a cam associated with such motion, inlet and outlet valves associated with said cylinder, a rider on said cam, said rider controlling the said valves to render said pump discharge inactive when said rider is riding on one portion of said cam, said discharge being normal while said rider is on another portion of said cam, a reservoir for liquid going to said pump, means controlled by said cam and rider for returning fluid which has passed through said pump to said reservoir.

10. A vehicle having a sprung portion, an unsprung supporting structure, a variable rate yielding support between said portions, a pump, said pump having a piston, a cylinder, said piston having stepped contour, a rider riding said stepped contour, said rider controlling the discharge of said pump for predetermined increment of piston motion, said control rendering said pump either effective as a pump or ineffective as a pump depending on the portion of said stepped contour that said rider is bearing against.

11. A vehicle having a sprung portion, an unsprung supporting structure, a variable rate yielding support between said portions, a pump, said pump having a piston, a cylinder, said piston having stepped contour, a rider riding said stepped contour, said rider controlling the discharge of said pump, a dash pot between said rider and said discharge control, said control rendering said pump inactive as a pump when said piston is oscillating in one first average position within said cylinder and fully effective as a pump when said piston is oscillating within said cylinder for the same length stroke but wth the average position within said cylinder at a substantially different average position than said first average position.

12. A vehicle having a sprung portion, an unsprung supporting structure, a variable rate yielding support between said portions, a pump, said pump having a piston, a cylinder, said piston having a stepped contour, a rider riding said stepped contour, said rider controlling the discharge of said pump for predetermined increment of piston motion depending on the portion of said stepped contour that said rider is bearing against, when said rider is riding on one portion of said stepped piston said pump being fully effective to pump liquid, when said rider is riding on another stepped portion, said pump being ineffective as a pump, when said rider is riding on another portion said pumped liquid being released to lower the pressure on said pumped liquid.

13. A vehicle having a sprung portion, an unsprung supporting structure, a variable rate yielding support between said portions, a pump, said pump having a piston, a cylinder, said piston having a stepped contour, a rider riding said stepped contour, said rider controlling the discharge of said pump for predetermined increment of piston motion depending on the portion of said stepped contour that said rider is bearing against, when said rider is riding on one portion of said stepped piston said pump being fully effective to pump liquid when said rider is riding on another stepped portion, said pump being ineffective as a pump, when said rider is riding on another portion said pumped liquid being released to lower the pressure on said pumped liquid, said pumped liquid controlling the effective support of said variable rate yielding support.

14. In a rear suspension system for an automotive vehicle, the combination comprising a sprung assembly and an unsprung assembly, said unsprung assembly comprising a rear axle and a pair of laterally spaced ground engaging wheels mounted on said axle, a main suspension spring disposed adjacent each said wheel and connected with said sprung and unsprung assemblies so as to act in a generally vertical direction to yieldably support said sprung assembly on said unsprung assembly for relative vertical movement, a pair of angularly extending auxiliary coil springs disposed between said sprung and unsprung assemblies, an angularly disposed hydraulic direct acting tubular shock absorber extending through each of said coil springs, each of said shock absorbers including relatively moveable telescopic parts, means on each of said shock absorber parts engaging and supporting the opposite ends of the adjacent coil spring so that telescoping and extension of said shock absorber parts and compression and extension of said coil springs occurs simultaneously, one of said parts of each of said shock absorbers being connected with said rear axle of said unsprung assembly adjacent one of said main suspension springs, the other part of each of said shock absorbers being connected with said sprung assembly laterally inwardly of the connection to said unsprung assembly so that each said shock absorber and the adjacent coil spring extends angularly between said sprung and unsprung assemblies so as to provide a lateral component to resist lateral sway of said sprung assembly relative to said unsprung assembly while simultaneously adding a vertical component to the resistance to vertical movement provided by said main springs between said sprung and unsprung assemblies.

References Cited in the file of this patent

UNITED STATES PATENTS

| | | |
|---|---|---|
| 1,530,043 | George | Mar. 17, 1925 |
| 2,021,043 | Bedford | Nov. 12, 1935 |
| 2,323,204 | Cross | June 29, 1943 |
| 2,361,575 | Thompson | Oct. 31, 1944 |
| 2,518,733 | Walker | Aug. 15, 1950 |
| 2,592,391 | Butterfield | Apr. 8, 1952 |
| 2,620,182 | Marston | Dec. 2, 1952 |

FOREIGN PATENTS

| | | |
|---|---|---|
| 1,079,671 | France | May 19, 1954 |